Sept. 11, 1962     J. H. BOPST III     3,053,302

TRACTION DEVICE

Filed June 5, 1961

INVENTOR
John H. Bopst, III

BY Robert C. Sullivan
ATTORNEY

United States Patent Office 3,053,302
Patented Sept. 11, 1962

3,053,302
TRACTION DEVICE
John H. Bopst III, 907 Belgian Ave., Baltimore 18, Md.
Filed June 5, 1961, Ser. No. 114,827
9 Claims. (Cl. 152—226)

This invention relates to a traction device for use on the wheels of automotive vehicles, and more particularly to an easily attachable traction device which provides greatly improved traction for an automotive vehicle under slippery road conditions such as those caused by snow, ice, or mud.

While many traction devices are known in the prior art for attachment to the wheels of automotive vehicles, many of the devices of the prior art are unsatisfactory for various reasons. Thus, the prior art traction devices are generally difficult and complicated to install, particularly under the adverse road conditions prevailing when their use is required, many of the prior art devices being particularly difficult for women drivers to install. Furthermore, most of the prior traction devices include traction links having either flat or rounded surfaces which do not provide sufficient gripping or traction under the slippery road conditions with which they are used. Still a further defect of many of the prior art traction devices is that they are not easily adjustable to fit different size wheels.

Accordingly, it is an object of this invention to provide an improved traction device for use with automotive vehicles which provides a high degree of traction under slippery road conditions.

It is another object of the invention to provide an improved traction device for automotive vehicles which may be easily installed in a very short time by any driver and which even a woman driver can easily install with very little effort.

Still another object of the invention is to provide a traction device for automotive vehicles which may be easily adjusted to fit different sizes of tires and in which the same traction device can be adjusted to fit both domestic and foreign automotive vehicles.

Still a further object of the invention is to provide a traction device for automotive vehicles which has a minimum of operating parts which are connected to each other by durable and strong connections to provide great overall protection against wear or breakage.

In achievement of these objectives, there is provided in accordance with an embodiment of this invention a traction device for use on wheels of automotive vehicles, including a pair of support members which are disposed at diametrically opposite sides of the wheel when the device is in use, each support member including a pair of circumferentially spaced radially extending arms which support a traction link section including a set of interconnected, articulated traction link elements which overlie the tread of the tire. One of the support members has pivotally connected thereto a rack member which cooperates with a similar rack member detachably connected to the other support member, both rack members being driven by a manually operable drive pinion to permit tightening of the traction link sections with respect to the wheel. The connection of the support members to the traction link sections is adjustable to permit radial adjustment of the traction device to conform to different sizes of wheels. The construction of the diametrically opposed traction link sections is an important feature of the invention since each traction link section includes a plurality of pivotally interconnected gripper plates and end sections having ground-engaging ribs terminating at their outer ground-engaging boundary in relatively sharp edges to provide improved traction characteristics as compared to the prior art.

Further objects and advantages of the invention will become apparent from the following description taken in conjunction with the accompanying drawing in which.

Figure 1:
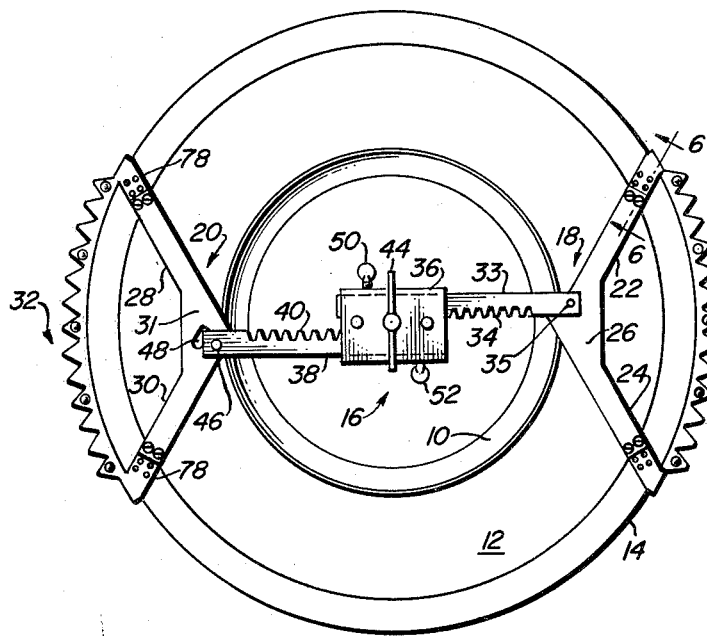
FIG. 1 shows a wheel of an automotive vehicle having mounted thereon a traction device in accordance with the invention.
Figure 2:
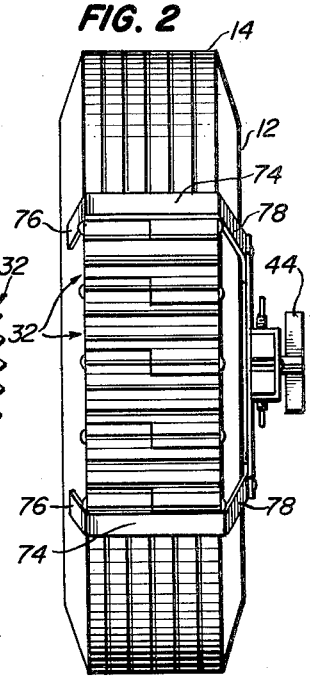
FIG. 2 is a side elevation of the wheel of FIG. 1 with the traction device mounted thereon.
Figure 3:
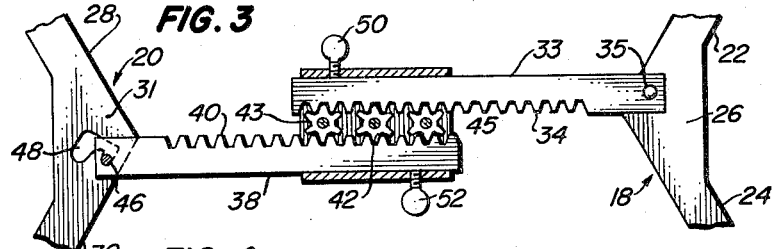
FIG. 3 is an enlarged detail view, partially in section, and partially broken away, of the traction device of the invention.
Figure 4:
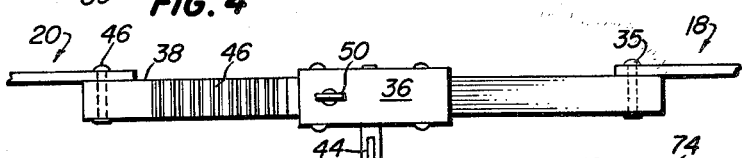
FIG. 4 is a top plan view of a portion of the traction device shown in FIG. 3.

Referring now to the drawing, there is shown in FIGS. 1 and 2 a wheel of an automotive vehicle including a rim 10 and a tire 12 having a tread portion 14.

The traction device of the invention is generally indicated at 16 and includes a pair of supports generally indicated at 18 and 20, respectively, which, when the traction device is installed, are located at diametrically opposite sides of the wheel, as best seen in FIG. 1. The supports 18 and 20 are each of generally V shape, with the arms of the V radiating radially outwardly. The support 18 includes a pair of arms 22 and 24 which radiate from a broad apex 26, while the support 20 includes a pair of arms 28 and 30 which diverge radially from a broad apex 31. A set of interconnected traction links or traction link section generally indicated at 32 is connected between the arms 22 and 24 of support 18 and between the arms 28 and 30 of support 20. The detailed construction of traction link section 32 will be described hereinafter.

A rack member 33 having teeth 34 is pivotally connected by a fixed pivotal connection 35 to the apex 26 of support 18. The radially inner end of rack 33 is received within a gear housing or sleeve 36 which also receives the radially inner end of a second rack 38 having teeth 40. The two racks 33 and 38 extend parallel to but laterally spaced from each other, with the rack teeth 34 and 40 in facing but laterally spaced relation to each other.

To impart motion to the racks 33 and 38 and thus to tighten the traction link sections 32 as will be described more fully hereinafter, a pinion gear 42 is supported for rotation about a fixed axis within sleeve 36, gear 42 being positioned intermediate the parallel racks 33 and 38 so that the teeth of pinion gear 42 mesh with the teeth 34 and 40 of both of the racks 33 and 38. An operating handle 44 located outside sleeve 36 adjacent the outer wall of the sleeve is attached to the outer end of the shaft on which pinion gear 42 is mounted to permit manual rotation of the pinion gear when desired. Pinion 42 may be rotated through several revolutions or more if necessary to obtain proper tightening of the traction device. Idler pinions 43 and 45 are supported for rotation by sleeve 36 on opposite sides of pinion 42, pinions 43 and 45 engaging rack teeth 34 and 40 to stabilize the movement of the racks 33 and 38.

The rack 38 is provided at its radially outer end with a headed pin or stud 46 which is adapted to be detachably received in a slot 48 located in the apex region 31 of support 20. A pair of set screws 50 and 52 extend through the opposite top and bottom walls of sleeve 36. Set screw 50 can be tightened into frictional engagement with rack 33 while set screw 52 may be tightened into frictional engagement with rack 38 to prevent movement of the rack members 33 and 38 after the racks have been adjusted by rotation of pinion 42 to a given adjusted position, as will be explained more fully hereinafter.

The traction link section generally indicated at 32 includes a plurality of articulated gripper plates 56 (FIG. 5) which are pivotally connected together to conform as a group to the curvature of the tire tread 14. Each gripper plate 56 is an integral member made of a suitable strong durable material and includes a base surface 58 which lies in contact with the outer surface of the tire tread 14. Each gripper plate 56 also includes an outer surface defined by a plurality of ribs of triangular cross-section, such as those indicated at 60, 62, 64 and 66, the ribs extending transversely of the tire tread. Each of the ribs 60, 62, 64, 66 terminates at its radially outer boundary in a relatively sharp edge which is adapted to bite into the road surface being traversed by the vehicle to provide a greatly improved traction for the vehicle, this edge defining the apex of the triangular cross-section rib.

It will be noted that the ribs 62 and 64 of the gripper plate 56 extend for substantially the entire transverse width of tire tread 14, while the rib portions 60 and 66 at the outer ends of the gripper plate 56 extend for only substantially one-half of the transverse width of the tire tread. The use of the half-width rib portions such as 60 and 66 permits the gripper plate 56 to be interlocked either with other similar gripper plates 56 or with the half rib 73 of an end piece generally indicated at 68 by means of which the traction section 33 is connected to either support 18 or 20. As best seen in FIGS. 1 and 2, a plurality of gripper plates 56 are interconnected by means of bolts 70 which extend through aligned passages 72 in the mating half-width rib portions of adjacent gripper plates 56.

At each of the opposite circumferential ends of the plurality of connected gripper plates 56, an end section 68 which also has an integral half-width rib portion 73 is connected by a bolt 70 to the end of the mating gripper plate 56, with the gripper plate 56 and attached end section 68 each having a half-width rib portion which mates with a half-width rib portion of the connected member to form a composite full width rib portion. Suitable nuts are provided on the ends of the bolts 70 to hold the members in assembled relation.

Figure 5:
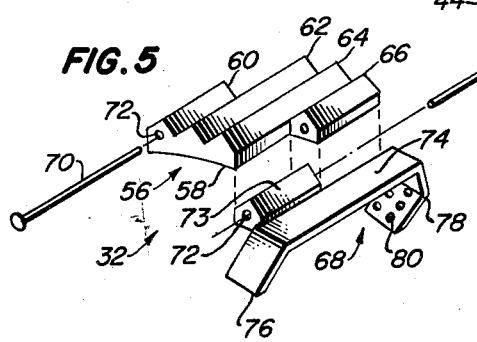
FIG. 5 is an enlarged perspective view of the traction links or gripper plates which form a part of the traction device.
Figure 6:
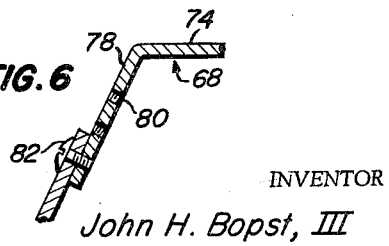
FIG. 6 is an enlarged elevation view in section showing the adjustable connection between the traction links and the support member for the traction links.

It will be noted from the views of FIGS. 2 and 5 that each end section 68 includes bent end portions 76 and 78 which respectively are shaped to lie in overlying relation to the inside and outside side walls of the tire. The bent end portions 78 of end sections 68 in effect constitute extensions of the support arms 22, 24, 28, 20 which permit adjustment of the effective length of support arms 22, 24, 28, 30 to permit adapting the traction device to wheels of different diameters. Obviously, the adjustable portion 78 could be made separate from end section 68 if desired. The bent end portion 78 of each end member 68 includes a plurality of rows of apertures 80 which, in the illustrated embodiment, are internally threaded to receive threaded screws 82 which secure the end portions 78 to the outer ends of arms 22, 24 of support 18 and of arms 28, 30 of support 20. Obviously, other types of detachable fasteners than the screws 82 may be used to connect the arms of the support members 18 and 20 to the end members 68. The use of the plurality of rows of apertures 80 in the end portions 78 permits the combined radial length of the bent end portion 78 and of any one of the arms 22, 24, 28, 30 to be adjusted to conform to different sizes of vehicle wheels. Once the proper adjustment is made for a given vehicle, the connection between either of the support members 18 and 20 and its corresponding traction link section 32 remains fixed.

In using the traction device of the invention, it will be understood that the assembly when used by the motorist is in two sections or subassemblies. One sub-assembly is formed by the support 18 and its connected traction link section 32, plus the rack 33 which is permanently pivotally connected to support 18, plus the sleeve 36 with the pinion gears 42, 43, 45 contained therein, plus the rack 38 which is received in the sleeve 36. The other sub-assembly is defined by the support 20 and its connected traction link section 32.

When installing the traction device on the vehicle wheel, the support 18 with its attached traction link section 32 and other connected parts just enumerated is positioned on the vehicle wheel with the traction link section 32 in overlying relation to the tread of the tire, with the bent portions 76 at each end of the traction link section 32 being hooked over the tread of the tire and lying adjacent the inner surface of the tire, and with the bent portions 78 lying on the outside face of the tire. Similarly, the support 20 with its corresponding traction link section 32 is positioned in overlying relation to a diametrically opposite portion of the wheel, with the bent portions 76 at opposite ends of traction link section 32 being hooked over the tire and lying in overlying relation to the inner surface of the vehicle tire, and with the bent portions 78 lying in overlying relation to the outer face of the tire. With the members positioned as just described, the rack members 33 and 38 and the sleeve 36 are then swung upwardly to a horizontal position about the pivotal connection 35 of the rack 33 to support 18, and the pin or stud 46 at the outer end of rack 38 is engaged with the slot 48 of support 20. The members are then substantially all in the position shown in FIG. 1 except that the traction link sections 32 have not yet been tightened into firm engagement with the tire.

The traction device is tightened into engagement with the tire by rotating handle 44 to rotate pinion 42. This causes the two rack members 33 and 38 to move radially inwardly toward each other to thereby tighten the diametrically opposed traction link sections 32 into tight engagement with the tire. When the traction link sections 32 have been sufficiently tightened, the set screws 50 and 52 may then be manually tightened to hold the assembly in position to prevent slippage or reverse movement of the rack members 33 and 38. The steps just described are reversed to remove the traction device from the wheel.

All parts of the traction device are formed of strong, durable material, preferably a suitable metal, to provide long and efficient usage.

It can be seen from the foregoing that there is provided in accordance with this invention a traction device which represents a substantial improvement over the prior art. The traction elements with their sharpened rib configuration provide an excellent gripping action on the road under slippery conditions such as those caused by ice, snow, and mud. Furthermore, the traction device is very easily installed on the vehicle wheel under adverse road conditions and does not require that the vehicle be jacked up for installation. The traction device is installed on the wheel entirely from the outside of the wheel, being easily hooked over the inside edge of the tire from the outside of the wheel, and does not require any adjustments or manipulations on the inside surface of the wheel. Thus, it can be seen that the traction device is very easy to install and can be easily engaged with or disengaged from the vehicle wheel, making the device particularly suitable for use by women drivers. The rack and pinion mechanism provided for tightening the traction device is easily operated by merely rotating the handle which rotates the drive pinion. The geared engagement of the rack and pinion provides a wide range of exact adjustment in tightening the traction device onto the wheel.

Furthermore, the traction device is easily adjustable to conform to different sizes of vehicle wheels and a given traction device may be easily adjusted to fit numerous domestic and foreign automotive vehicles. A given traction device can be adjusted to fit a wide range of sizes of passenger vehicles, with a larger traction device being provided for a wide range of truck sizes.

While there has been shown and described a particular embodiment of the invention, it will be obvious to those skilled in the art that various changes and modifications may be made therein without departing from the invention and, therefore, it is aimed to cover all such changes and modifications as fall within the true spirit and scope of the invention.

What I claim as my invention is:

1. A traction device adapted to be detachably connected to a wheel of an automotive vehicle having a tire thereon, comprising a first and a second support member positioned at diametrically opposite locations facing the outside of the wheel, traction link means supported by each of said support members in engagement with the tread of the tire, a first and a second rack member, one of said rack members being connected to one of said support members by a pivotal connection, the other of said rack members being connected to the other of said support members by an easily attachable pin-and-slot connection, each of said rack members extending into a common housing, pinion means carried by said housing and engageable with each of said rack members, and means for rotating said pinion means to move said rack members and thereby tighten said traction link means against the tire.

2. A traction device adapted to be detachably connected to a wheel of an automotive vehicle having a tire thereon, comprising a first and a second support member positioned at diametrically opposite locations facing the outside of the wheel, means for adjusting the effective radial length of said support members to permit adapting said traction device to wheels of different diameters, traction link means supported by each of said support members in engagement with the tread of the tire, a first and a second rack member respectively connected to said first and second support members, one of said rack members being connected to one of said support members by a pivotal connection, the other of said rack members being connected to the other of said support members by an easily attachable pin-and-slot connection, each of said rack members extending into a common housing, pinion means carried by said housing and engageable with each of said rack members, and means for rotating said pinion means to move said rack members and thereby tighten said traction link means against the tire.

3. A traction device adapted to be detachably connected to a wheel of an automotive vehicle having a tire thereon, comprising a first and a second support member positioned at diametrically opposite locations facing the outside of the wheel, each of said support members including a pair of diverging radially extending arms circumferentially spaced from each other at their radially outer ends, traction link means connected between the pair of radially extending arms of each support member and adapted to lie in engagement with the tread of the tire, a first and a second rack member respectively connected to said first and second support members, one of said rack members being connected to one of said support members by a pivotal connection, the other of said rack members being connected to the other of said support members by an easily attachable pin-and-slot connection, each of said rack members extending into a common housing, pinion means carried by said housing and engageable with each of said rack members, and means for rotating said pinion means to move said rack members and thereby tighten said traction link means against the tire.

4. A traction device adapted to be detachably connected to a wheel of an automotive vehicle having a tire thereon, comprising a first and a second support member positioned at diametrically opposite locations facing the outside of the wheel, traction link means supported by each of said support members in engagement with the tread of the tire, a first and a second rack member respectively connected to said first and second support members, one of said rack members being connected to one of said support members by a pivotal connection, the other of said rack members being connected to the other of said support members by an easily attachable pin-and-slot connection, each of said rack members extending into a common housing, pinion means carried by said housing and engageable with each of said rack members, means for rotating said pinion means to move said rack members and thereby tighten said traction link means against the tire, and means to secure said rack members and pinion means in a given adjusted position.

5. A traction device adapted to be detachably connected to a wheel of an automotive vehicle having a tire thereon, comprising a first and a second support member adapted to be positioned at diametrically opposite locations facing the outside of the wheel, each of said support members including a pair of diverging radially extending arms circumferentially spaced from each other at their radially outer ends, traction link means connected between the pair of radially extending arms of each support member and adapted to lie in engagement with the tread of the tire, means for adjusting the effective radial length of said support members to permit adapting said traction device to wheels of different diameters, a first and a second rack member, one of said rack members being connected to one of said support members by a pivotal connection, the other of said rack members being connected to the other of said support members by an easily attachable pin-and-slot connection, each of said rack members extending into a common housing, pinion means carried by said housing and engageable with each of said rack members, means for rotating said pinion means to move said rack members and thereby tighten said traction link means against the tire, and means to secure said rack members and pinion means in a given adjusted position.

6. A traction device adapted to be detachably connected to a wheel of an automotive vehicle having a tire thereon, comprising a plurality of pivotally connected traction elements, each of said traction elements including a radially inner surface engaging the tread of the tire and a radially outer surface including a plurality of ribs extending transversely of the tread of the tire, said ribs being respectively of triangular cross-section and including a ground engaging edge which defines the apex of the triangular cross-section of the rib, each of said traction elements including a portion of reduced width transversely of the tire tread at opposite circumferential ends thereof for pivotal connection to a corresponding portion of reduced width of a mating traction element, and means adapted to connect said plurality of traction elements to the wheel of the vehicle.

7. A traction device adapted to be detachably connected to the wheel of an automotive vehicle having a tire thereon, comprising a plurality of pivotally connected traction elements, each of said traction elements including a radially inner surface engaging the tread of the tire and a radially outer surface including a plurality of ribs extending transversely of the trend of the tire, said ribs being respectively of triangular cross-section and including a ground-engaging edge which defines the apex of the triangular cross-section of the rib, an end section at each of the circumferential ends of said traction device, means pivotally connecting each end section to an end traction element, and means connected to said end sections to tighten said traction device onto the tire.

8. A traction device as defined in claim 7 in which each end section includes a portion of reduced width transversely of the tread of the tire pivotally connected to a portion of reduced width of an adjacent traction element.

9. A traction device adapted to be detachably connected to the wheel of an automotive vehicle having a tire thereon, comprising a plurality of pivotally connected traction elements, each of said traction elements including a radially inner surface engaging the tread of the tire, and a radially outer surface including a plurality of ribs extending transversely of the tread of a tire, said ribs being respectively of triangular cross-section and including a ground-engaging edge which defines the apex of the triangular cross-section of the rib, an end section at each of the circumferential ends of said traction device, means pivotally connecting each end section to an end traction element, said end sections including portions in overlying relation to the inside and outside walls of the tire, and means connected to the portion of said end section overlying the outside wall of the tire to tighten said traction device onto the tire.

References Cited in the file of this patent

UNITED STATES PATENTS

| | | |
|---|---|---|
| 2,426,683 | Harrop | Sept. 2, 1947 |
| 2,640,522 | Schroen | June 2, 1953 |
| 2,754,874 | Gardner | July 17, 1956 |
| 2,880,776 | Rucker | Apr. 7, 1959 |
| 2,946,366 | Saperstein | July 26, 1960 |